United States Patent
Davis et al.

[11] Patent Number: 5,836,690
[45] Date of Patent: Nov. 17, 1998

[54] ROTATABLE MIXING HEAD HAVING SEALED BEARINGS

[75] Inventors: Steven W. Davis, Lancaster; Brian T. Gibbs, Hurst; Frank Rosner, Roanoke, all of Tex.

[73] Assignee: Ultimate Environmental Mixing, Inc., Lancaster, Tex.

[21] Appl. No.: 992,557

[22] Filed: Dec. 17, 1997

[51] Int. Cl.[6] ........................................ B01F 7/18
[52] U.S. Cl. ................................ 366/325.2; 366/325.3; 366/326.1; 366/331
[58] Field of Search ........................... 366/64–66, 96–98, 366/102–104, 262–265, 270, 279, 325.1, 325.2, 325.3, 331, 342, 343, 326.1

[56] References Cited

U.S. PATENT DOCUMENTS

| | | |
|---|---|---|
| 3,038,643 | 6/1962 | Van Der Lely et al. . |
| 3,887,166 | 6/1975 | Van Ginneken . |
| 3,986,705 | 10/1976 | Nauta ................................... 366/325.2 |
| 4,162,102 | 7/1979 | Rooymans . |
| 4,441,824 | 4/1984 | Brokaw ................................... 366/266 |
| 4,810,099 | 3/1989 | Langsetmo et al. . |
| 5,013,185 | 5/1991 | Taki . |
| 5,212,892 | 5/1993 | Maitlen et al. . |
| 5,435,176 | 7/1995 | Manchak, III . |
| 5,556,196 | 9/1996 | Lin ........................................... 366/66 |
| 5,631,160 | 5/1997 | Bruso . |
| 5,639,182 | 6/1997 | Paris . |
| 5,656,041 | 8/1997 | Hylton . |

*Primary Examiner*—Charles E. Cooley
*Attorney, Agent, or Firm*—John A. Thomas

[57] ABSTRACT

A mixing head assembly attachable to a boom of an excavating machine comprising a torque tube supporting a motor mounted within the torque tube, and a mounting assembly for attaching the mixing head assembly to the boom of an excavating machine. The device has a rotatable mixing head supported by a drive shaft and driven by the motor, which mixing head supports mixing arms and other implements. The rotating casing of the mixing head defines a first cavity enclosing a bearing housing, which bearing housing defines a second cavity. The bearing housing is stationary with respect to the torque tube. Grease is forced through the first cavity and out a seal engaging the casing, thus keeping contaminants from the bearings. Oil is forced through the second cavity and recirculated to lubricate the bearings and prevent contaminates from entering the bearings. A water spray may be provided for suppressing dust. A header is provided for delivering dry or liquid reagents to the mixing site.

18 Claims, 4 Drawing Sheets ( VIEW 2-2 )

ROTATABLE MIXING HEAD HAVING SEALED BEARINGS

BACKGROUND

This invention relates to mixing heads used in the environmental remediation industry for mixing and agitating waste or sludge. At most hazardous waste sites, contaminated soil, chemicals, and trash are held in a containment pond. This waste must be thoroughly mixed with reagents or cement to render it either harmless or less likely to migrate to water-bearing strata. Operators have used excavating machinery such as bucket loaders to do this mixing. However, specially adapted mixers are much more efficient. In the present state of the art, such mixers use augers, belts having cutting teeth, or horizontally-rotating mixing heads. Ideally, the operator of the mixing machinery should be able to move the mixing head over the area to be mixed while also controlling its depth and the speed of the mixing. This can be difficult to do with current mixing heads which rotate along an axis substantially horizontal to the surface of the earth. Because of their relatively large surface area to weight ratio, horizontal mixing heads are not easily forced deep into waste ponds, and they tend to become stuck under heavy overburden. Further, horizontally rotating mixing heads are easily tangled in the scrap and wire often found in waste sites. Other mixing machines use augers, but augers also become tangled in scrap and have poor mixing abilities. A mixing head must operate in a hostile environment. It is likely the wastes to be mixed will be dense, contain corrosive chemicals, large heavy objects which can break mixing arms, and also fine abrasive particles which can quickly wear out mixing arms and bearings. The prior-art horizontal mixing heads have unprotected shafts and seals which are particularly susceptible to this kind of wear. Prior-art mixing machines are further susceptible to rapid wear and failure because they do not incorporate the combination of protected thrust bearings and radial bearings of the present invention.

There is thus a need for a mixing head having sufficient power to mix heavy material, easily moveable both laterally and vertically, and resistant to tangling or impact with heavy objects. Such a mixing head should also resist the effects of corrosive and abrasive material in the mixing site.

SUMMARY

The present invention meets all of these needs. In the preferred embodiment of the invention, a mixing head assembly is attachable to a boom of an excavating machine. The mixing head assembly comprises a torque tube having an axis, a first end and a second end; the torque tube further comprises a hydraulic motor mounted within the torque tube adjacent to the first end of the torque tube; the hydraulic motor being optionally connected to a gear box; the gear box having an output shaft; the hydraulic motor and gear box axially aligned with the axis of the torque tube. A mounting assembly is attached to the second end of the torque tube for removably attaching the mixing head assembly to the boom of an excavating machine, and a plurality of implement attachment points are connected to the torque tube. The mixing head further comprises a rotatable mixing head, itself comprising a bearing housing attached to the first end of the torque tube; the bearing housing further comprising a drive bearing assembly concentric with the drive shaft; the drive bearing assembly attached to the drive end of the bearing housing; an impeller bearing assembly concentric with the drive shaft; the impeller bearing assembly attached to the impeller end of the bearing housing. A means is provided for delivering lubricating oil under pressure to the drive bearing assembly and the impeller bearing assembly and a means for recirculating the lubricating oil from the drive bearing assembly and the impeller bearing assembly, thereby sealing the drive bearing assembly and the impeller bearing assembly from the external environment.

The rotatable mixing head has a casing enclosing the bearing housing and rotatable about the bearing housing. The casing defines a cavity about the bearing housing. The casing externally has a plurality of sockets for receiving a plurality of mixing arms; a drive shaft passing through the bearing housing; the drive shaft having a drive end and an impeller end; the drive end of the drive shaft engaging the output shaft of the gear box, or of the motor, if no gear box is provided. The impeller end of the drive shaft engages the casing, so that the motor rotates the casing about the bearing housing. A means is provided for sealing the bearing housing from the external environment. This sealing means further comprises a resilient cap attached to the first end of the torque tube and sealingly engaging the casing.

The rotatable mixing head also includes a means for delivering lubricant under pressure to the cavity defined by the casing, thereby causing the lubricant to be extruded from the cavity where the casing engages the resilient cap; and, at least one wear ring mounted co-axially between the bearing housing and the casing. In the preferred embodiment, the rotatable mixing head has the shape of a frustum of a cone, with the reduced end thereof distant from the motor.

The mixing head assembly is fitted with a plurality of mixing arms removably attached to the sockets. The sockets and the mixing arms are disposed about the rotatable mixing head in at least one helical row; and, a means for attaching an implement to the rotatable mixing head is provided so that the attached implement can rotate with the rotatable mixing head. When desired, implements which are freely rotatable with respect to the rotatable mixing head can be used.

DRAWINGS

DETAILED DESCRIPTION

Figure 1:
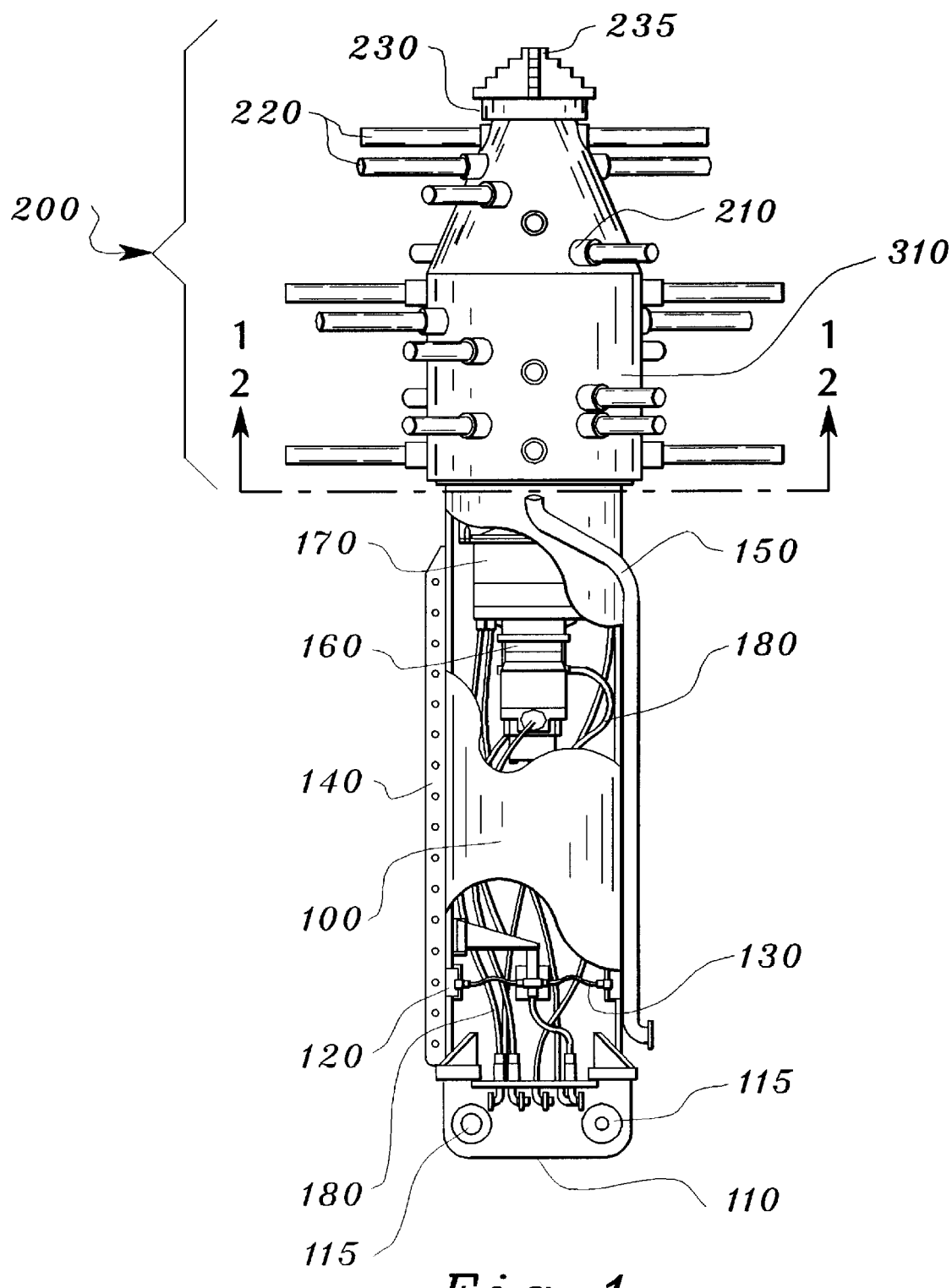
FIG. 1 shows a the mixing head assembly of the preferred embodiment, with a cut-away section of the torque tube revealing a hydraulic motor and fluid supply lines.
Figure 2:
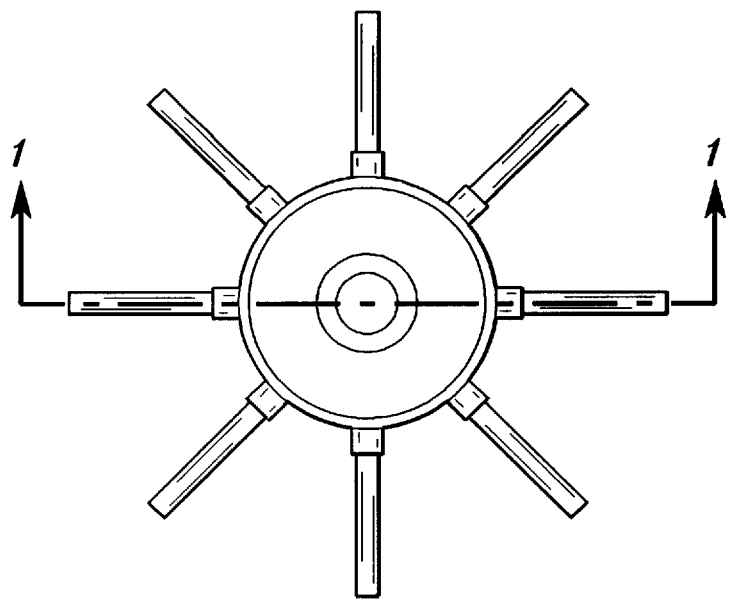
FIG. 2 shows a plan view of the mixing head assembly, looking toward the rotatable mixing head, to orient the section line of FIG. 4.
Figure 3:
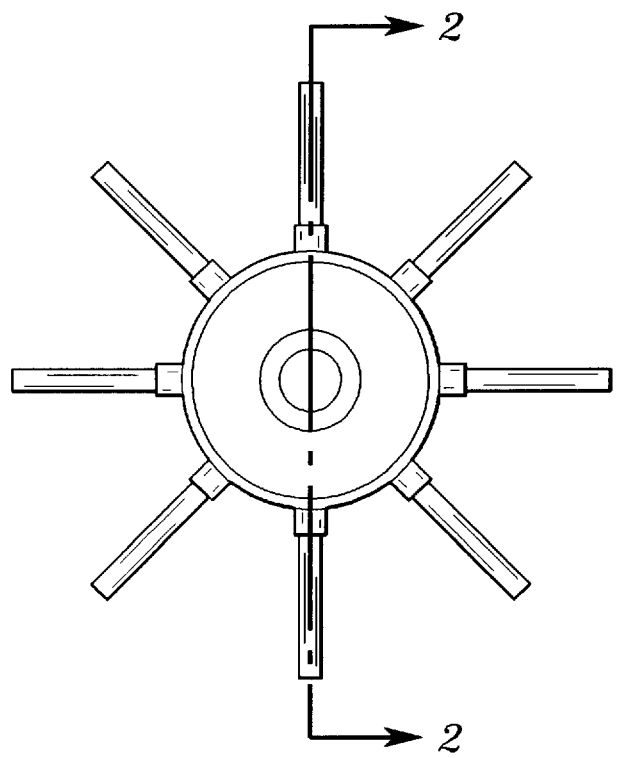
FIG. 3 shows a plan view of the mixing head assembly, looking toward the rotatable mixing head, to orient the section line of FIG. 5.

FIG. 1 shows the complete mixing head assembly of the preferred embodiment. The assembly comprises a torque tube 100, a mounting assembly 110, for mounting the mixing head assembly to the boom of an excavating machine, and a rotatable mixing head 200. The torque tube 100 supports the rotatable mixing head 200 and protects the motor 160 and a group of fluid lines 180 housed within the torque tube 100. The torque tube 100 is made to a length suitable for the mixing task likely to be encountered. A longer torque tube 100, for example, allows the mixing head assembly to be thrust into deeper containment ponds to achieve thorough mixing. The torque tube 100 contains the means for providing rotary power to the rotatable mixing head 200. In the preferred embodiment, this means is a high-torque, low-speed hydraulic motor 160. If required for additional torque, the hydraulic motor 160 may drive a reduction gear box 170. However, rotary power may also be provided by an electric motor, by electric or hydraulic motors with or without gear boxes, or by flexible couplings transmitting power from engines mounted on the excavating machine. In the preferred embodiment, the direction of rotation of the mixing head 200 may be selectively reversed by the operator.

This feature allows the mixing head assembly to dig out of material blocking its progress or untangle itself from wire or cable.

The mounting assembly 110 of the preferred embodiment is adapted to connect to the conventional mounts of excavating machinery. Such a conventional mount has flanges with holes through which a locking pin is inserted. The mounting assembly 110 of the preferred embodiment has corresponding holes 115 for receiving such pins and fixing the mixing head assembly to the boom of the excavating machinery.

In the preferred embodiment, the torque tube 100 holds and protects a group of lines 180 carrying hydraulic fluid, oil, and grease, for purposes described below. The torque tube 100 shown in FIG. 1 incorporates high pressure water nozzles 120 fed by water lines 130. A high-pressure spray of atomized water, without or without flocculants added, can thus be directed in the vicinity of the mixing area to suppress dust. The water lines 130 are brought to connections on the mounting assembly 110, so they may be connected to a remote water supply. The torque tube 100 and the mounting assembly 110 as shown in FIG. 1 also have attached a header 150 for delivering dry or liquid additives to the vicinity of the mixing area. The header 150 may be connected to a remote pump which will force the additive through the header 150 and into the mixing area.

The torque tube 100 of the preferred embodiment also has attached one or more implement attachment bars 140 for attaching pumps, shields, stabilizer bars, forced injection equipment, air scrubbers, or other tools required by the job.

FIG. 1 also shows the exterior of the rotatable mixing head 200. The mixing head is provided with a plurality of sockets 210 for connection with a corresponding plurality of mixing arms 220. In the preferred embodiment, the mixing arms 220 are removable to allow their replacement if they break or wear out in service, although in alternative embodiments, the mixing arms 220 could be welded or press fit to permanent attachment with the sockets 210. The mixing arms 220 may be attached to the sockets 210 by threaded collars, set screws, or by fasteners passing through the mixing arms 220 and sockets 210. The mixing arms 220 may be rigid or flexible. Rigid mixing arms 220 may be rods or tubes of diverse cross-sections, blades, or fluted castings. The shape of the mixing arms 220 may thus be adapted to the mixing task. Also, flexible mixing arms 220 may be used. Such flexible mixing arms 220 may be made of wire rope, rubber or plastic impregnated wire rope, or chain. Flexible mixing arms 220 are especially useful in applications where the mixing head assembly can be expected to encounter rocks or heavy junk which could break rigid mixing blades 220. In the preferred embodiment, the sockets 210 and the corresponding mixing arms 220 are disposed about the rotatable mixing head 200 in a helical line to provide more through mixing.

The rotatable mixing head 200 may have a means for attaching implements so that augers or cutting tools may be attached the rotatable mixing head 200. In the preferred embodiment, this means is an implement attachment plate 230. FIG. 1 shows as an example a cutting tool 235 attached to the attachment plate 230. Instead of an attachment plate 230, the means for attaching implements may be a threaded or keyed shaft, or other conventional means for attaching tools. Where a containment pond has a liner, it will be desirable to attach a freely rotatable, relatively smooth, implement to the attachment plate 230, so the rotatable mixing head will not injure the lining.

Figure 4:
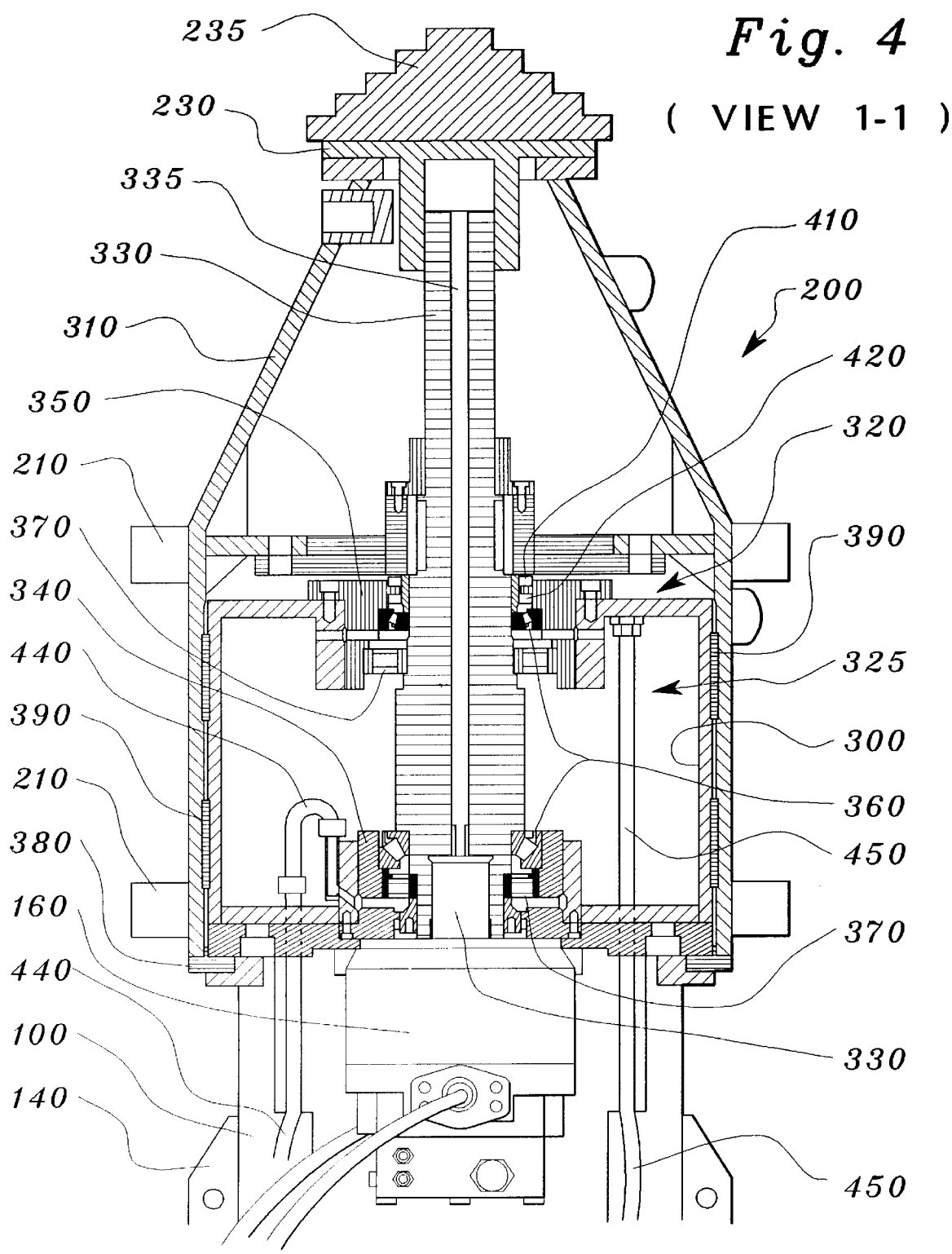
FIG. 4 shows a section view of the rotatable mixing head assembly, showing the shaft, bearings, seals, and the means for recirculating lubricants.
Figure 5:
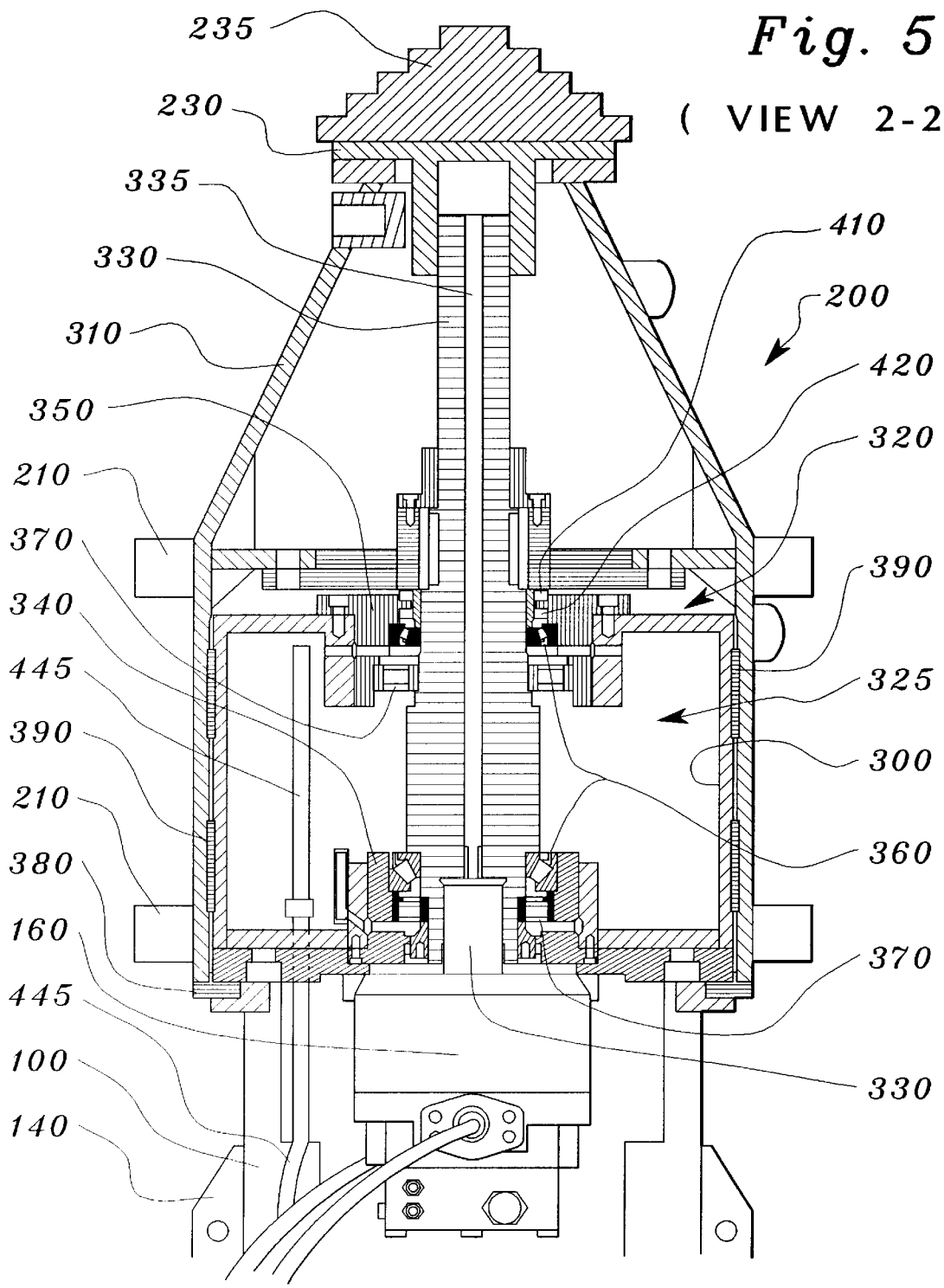
FIG. 5 shows a section view of the rotatable mixing head assembly radially offset from the view in FIG. 4. This view further shows the means for recirculating lubricants.

FIGS. 4 and 5 show cut-away views of the rotatable mixing head 200. The rotatable mixing head 200 has two main sections; a bearing housing 300 which is connected to the torque tube 100 and thus stationary with respect to the torque tube 100, and a casing 310, which is attached to the drive shaft 330, and rotatable with the drive shaft 330 about the bearing housing 300. Since the sockets 210 for the mixing arms 220 and the attachment plate 230 are also attached to the casing 310, the mixing arms 220 and the attachment plate 230 rotate with the casing 310. The drive shaft 330 in the preferred embodiment has a hollow core 335 to allow the rotatable mixing 200 head to be easily disassembled if the motor or gear box has seized. In the preferred embodiment, rotatable mixing head 200 has the shape of a frustum of a cone, with the reduced end thereof most distant from the motor 160. This shape allows the operator to more easily shake off debris or untangle wire from the rotatable mixing head 200. A cone shape also requires less power to rotate because of its smaller surface area, is easier to force into a mix, and it tends to direct the flow of material upward, so that blending takes place.

The bearing housing 300 and the casing 310 define a first cavity 320. As the casing 310 rotates, it sealingly engages a cap 380 of rubber or other resilient material, as shown in FIGS. 4 and 5. The bearing housing 300 is provided with at least one wear ring 390. A means is provided for circulating a lubricant through the first cavity 320. In the preferred embodiment, the lubricant flows through the first cavity 320 through a line 450, past the wear rings 390, and exudes from the rotatable mixing head 200 where the casing 310 engages the cap 380. In the preferred embodiment, pressure for the lubricant flow is provided by remotely located grease pump. In this way, the surfaces of the casing 310 and the bearing housing 300 are prevented from wearing directly against one another, and the positive flow of lubricant prevents abrasive particles and contaminants from entering the first cavity 320 and harming the bearings exposed there. The wear rings 390 are preferably disposable and replaceable. The preferred lubricant is grease. However, in some applications, it will be important that a bio-degradable lubricant be used. In this case, lard or another non-hydrocarbon lubricant, may be forced through the first cavity 320. This arrangement protects the bearings and drive mechanisms of the rotatable mixing head 200 from corrosive and abrasive elements in the environment, while still allowing free rotation of the rotatable mixing head 200 in either sense.

In the preferred embodiment, the rotatable mixing head 200 has a drive bearing assembly 340 and an impeller bearing assembly 350. These bearing assemblies maintain the drive shaft 330, and thus the rotatable mixing head 200 in axial alignment with the torque tube 100 and the motor 160 and optional gear box 170. Such bearings must resist both axial and radial loads as the mixing head assembly is forced through the material in the mixing site. Each bearing assembly 340 and 350 thus incorporates a thrust bearing 360 and a radial bearing 370. These bearings assemblies 340 and 350 are lubricated by oil which is forced into the second cavity 325 defined by the bearing housing 300. In the preferred embodiment, the lubricating oil is delivered under pressure into the second cavity 325 and thus through the drive bearing assembly 340 and the impeller bearing assembly 350 through a line 440 penetrating the bearing housing 300. Pressure is provided by a remotely located oil pump. Oil is recovered from the second cavity 325 defined by the bearing housing 300 and recirculated thorough a line 445 disposed to recover oil from the bearing housing 325 even when the rotatable mixing head 200 is positioned vertically. Other means of accomplishing the same result are a pump located in the cavity, or by allowing oil leakage from a hydraulic motor case into the second cavity 325, which oil is then recirculated from the second cavity 325 through the motor case drain.

Each impeller bearing assembly 350 incorporates an oil seal 420 and a grease seal 410 to prevent lubricating oil from leaking into the first cavity 320, and grease from leaking into the second cavity 325 defined by the bearing housing 300. Other features of the rotatable mixing head 200 are conventional and familiar to those skilled in the mechanical arts.

The reader will see that the need for a mixing head having sufficient power to mix heavy material, easily moveable both laterally and vertically, resistant to tangling or impact with trash, and less likely to be worn out by contact with a hostile environment has been attained by the present invention, as described above. Since certain changes could be made in the embodiment of the invention described above without departing from the spirit and scope of the invention, we intend that all matter contained in the foregoing description and drawings shall be interpreted as illustrative and not in a limiting sense. The reader should understand that the following claims are intended to cover all of the generic and specific features of the invention herein described and all statements of the scope of the invention which might be interpreted to fall between these features.

We claim:

1. A mixing head assembly attachable to a boom of an excavating machine, the mixing head assembly comprising:
   a. A torque tube having an axis, a first end and a second end, the torque tube further comprising:
      i. A means for providing rotary power mounted within the torque tube adjacent to the first end of the torque tube; the means for providing rotary power axially aligned with the axis of the torque tube;
      ii. A mounting assembly attached to the second end of the torque tube for removably attaching the mixing head assembly to the boom of an excavating machine;
   b. a rotatable mixing head comprising:
      i. a bearing housing attached to the first end of the torque tube; the bearing housing having a drive end and an impeller end;
      ii. A casing enclosing the bearing housing and rotatable about the bearing housing; the casing defining a cavity about the bearing housing; the casing externally having a plurality of sockets for receiving a plurality of mixing arms;
      iii. A drive shaft passing through the bearing housing; the drive shaft having a drive end and an impeller end; the drive end of the drive shaft engaging the means for providing rotary power; the impeller end of the drive shaft engaging the casing, so that the means for providing rotary power rotates the casing about the bearing housing; and,
      iv. means for sealing the bearing housing from the external environment.

2. The mixing head assembly of claim 1 where the bearing housing further comprises:
   a. a drive bearing assembly concentric with the drive shaft; the drive bearing assembly attached to the drive end of the bearing housing;
   b. an impeller bearing assembly concentric with the drive shaft; the impeller bearing assembly attached to the impeller end of the bearing housing; and,
   c. means for sealing the drive bearing assembly and the impeller bearing assembly from the external environment.

3. The mixing head assembly of claim 2 where the drive bearing assembly further comprises a thrust bearing and a radial bearing, the thrust bearing and the radial bearing maintaining the drive shaft in alignment with the means for providing rotary power.

4. The mixing head assembly of claim 2 where the impeller bearing assembly further comprises a thrust bearing and a radial bearing, the thrust bearing and the radial bearing maintaining the drive shaft in alignment with the means for providing rotary power.

5. The mixing head assembly of claim 2 where the means for sealing the drive bearing assembly and the impeller bearing assembly further comprises:
   a. a means for delivering lubricating oil under pressure to the drive bearing assembly and the impeller bearing assembly; and,
   b. a means for recirculating the lubricating oil from the drive bearing assembly and the impeller bearing assembly.

6. The mixing head assembly of claim 1 where the means for providing rotary power further comprises a gear box for multiplying the torque of the means for providing rotary power.

7. The mixing head assembly of claim 1 where the means for providing rotary power comprises a hydraulic motor.

8. The mixing head assembly of claim 1 where the means for providing rotary power comprises an electric motor.

9. The mixing head assembly of claim 1 where the torque tube further comprises a header for delivering additives to the vicinity of the mixing head assembly.

10. The mixing head assembly of claim 1 where the torque tube further comprises a means for spraying water in the vicinity of the mixing head assembly for controlling dust.

11. The mixing head assembly of claim 1 where the means for sealing the bearing housing from the external environment comprises a resilient cap attached to the first end of the torque tube and sealingly engaging the casing.

12. The mixing head assembly of claim 1 where the means for sealing the bearing housing further comprises a means for delivering lubricant under pressure to the cavity defined by the casing, thereby causing the lubricant to be extruded from the cavity where the casing engages the resilient cap.

13. The mixing head assembly of claim 1 where the rotatable mixing head further comprises at least one wear ring mounted co-axially between the bearing housing and the casing.

14. The mixing head assembly of claim 1 where the rotatable mixing head has a plurality of mixing arms attached to the sockets.

15. The mixing head assembly of claim 14 where the mixing arms are rigid.

16. The mixing head assembly of claim 14 where the mixing arms are flexible.

17. The mixing head assembly of claim 1 where the rotatable mixing head further comprises a means for attaching an implement to the rotatable mixing head.

18. A mixing head assembly attachable to a boom of an excavating machine, the mixing head assembly comprising:
- a. a torque tube having an axis, a first end and a second end, the torque tube further comprising:
  - i. a hydraulic motor mounted within the torque tube adjacent to the first end of the torque tube; the hydraulic motor connected to a gear box; the gear box having an output shaft; the output shaft engaging a drive shaft; the hydraulic motor and gear box axially aligned with the axis of the torque tube;
  - ii. a mounting assembly attached to the second end of the torque tube for removably attaching the mixing head assembly to the boom of an excavating machine;
  - iii. a plurality of implement attachment points connected to the torque tube;
- b. a rotatable mixing head having the shape of a frustum of a cone, the rotatable mixing head comprising:
  - i. a bearing housing having a drive end and an impeller end attached to the first end of the torque tube, the bearing housing further comprising:
    - (1) a drive bearing assembly concentric with the drive shaft; the drive bearing assembly attached to the drive end of the bearing housing;
    - (2) an impeller bearing assembly concentric with the drive shaft; the impeller bearing assembly attached to the impeller end of the bearing housing; and, '(3) a means for delivering lubricating oil under pressure to the drive bearing assembly and the impeller bearing assembly and a means for recirculating the lubricating oil from the drive bearing assembly and the impeller bearing assembly, thereby sealing the drive bearing assembly and the impeller bearing assembly from the external environment; and,
  - ii. a casing enclosing the bearing housing and rotatable about the bearing housing; the casing defining a cavity about the bearing housing; the casing externally having a plurality of sockets for receiving a plurality of mixing arms;
  - iii. a drive shaft passing through the bearing housing; the drive shaft having a drive end and an impeller end; the drive end of the drive shaft engaging the output shaft of the gear box; the impeller end of the drive shaft engaging the casing, so that the hydraulic motor and the gear box rotate the casing about the bearing housing; and
  - iv. means for sealing the bearing housing from the external environment; the sealing means further comprising:
    - (1) a resilient cap attached to the first end of the torque tube and sealingly engaging the casing;
    - (2) a means for delivering lubricant under pressure to the cavity defined by the casing, thereby causing the lubricant to be extruded from the cavity where the casing engages the resilient cap; and,
  - v. at least one wear ring mounted co-axially between the bearing housing and the casing;
- c. a plurality of mixing arms removably attached to the sockets; the sockets and the mixing arms disposed about the rotatable mixing head in at least one helical row; and,
- d. a means for attaching an implement to the rotatable mixing head.

* * * * *